Oct. 9, 1945.  G. A. LYON  2,386,244
WHEEL STRUCTURE
Filed Jan. 7, 1944  2 Sheets-Sheet 1
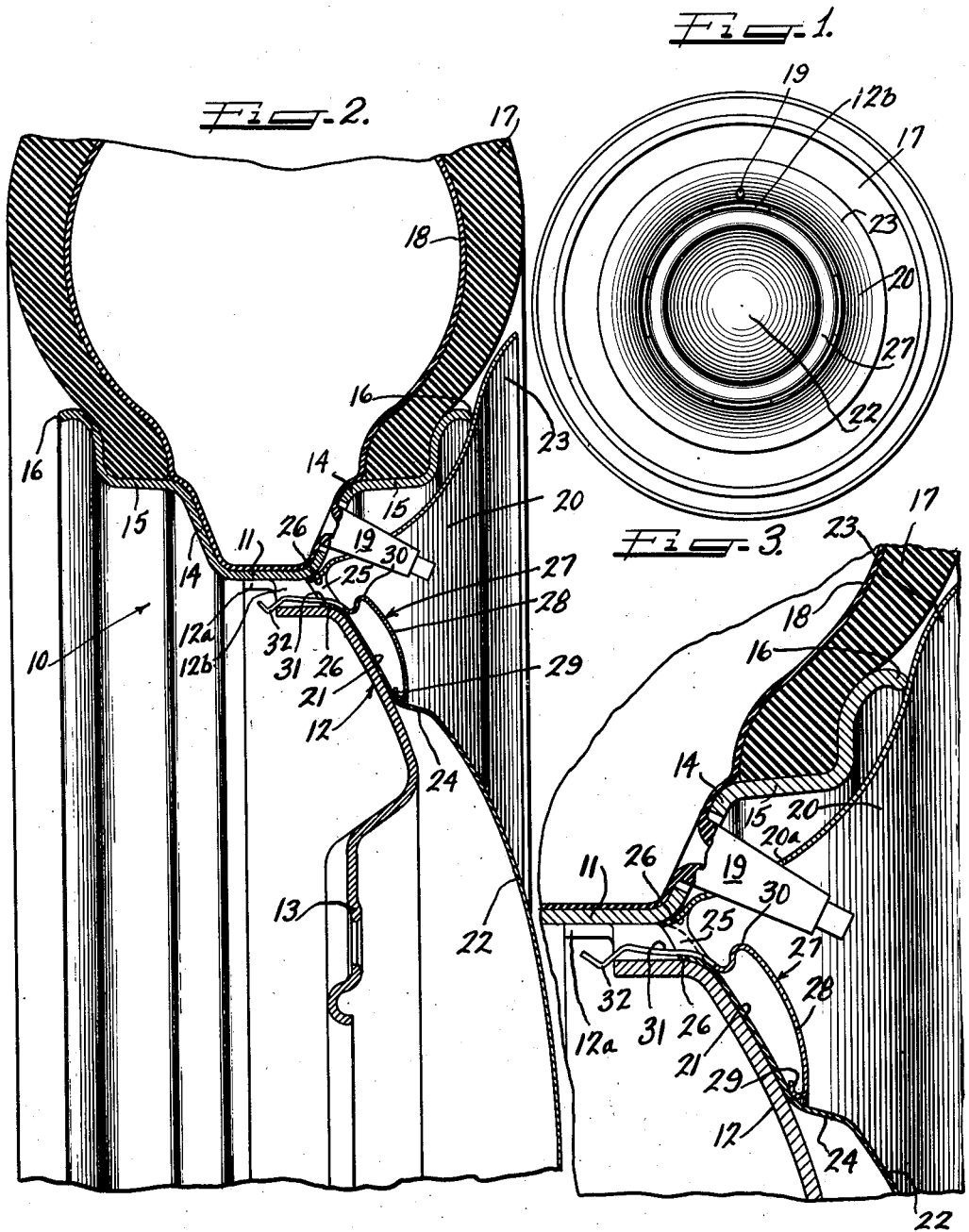
Inventor
GEORGE ALBERT LYON.

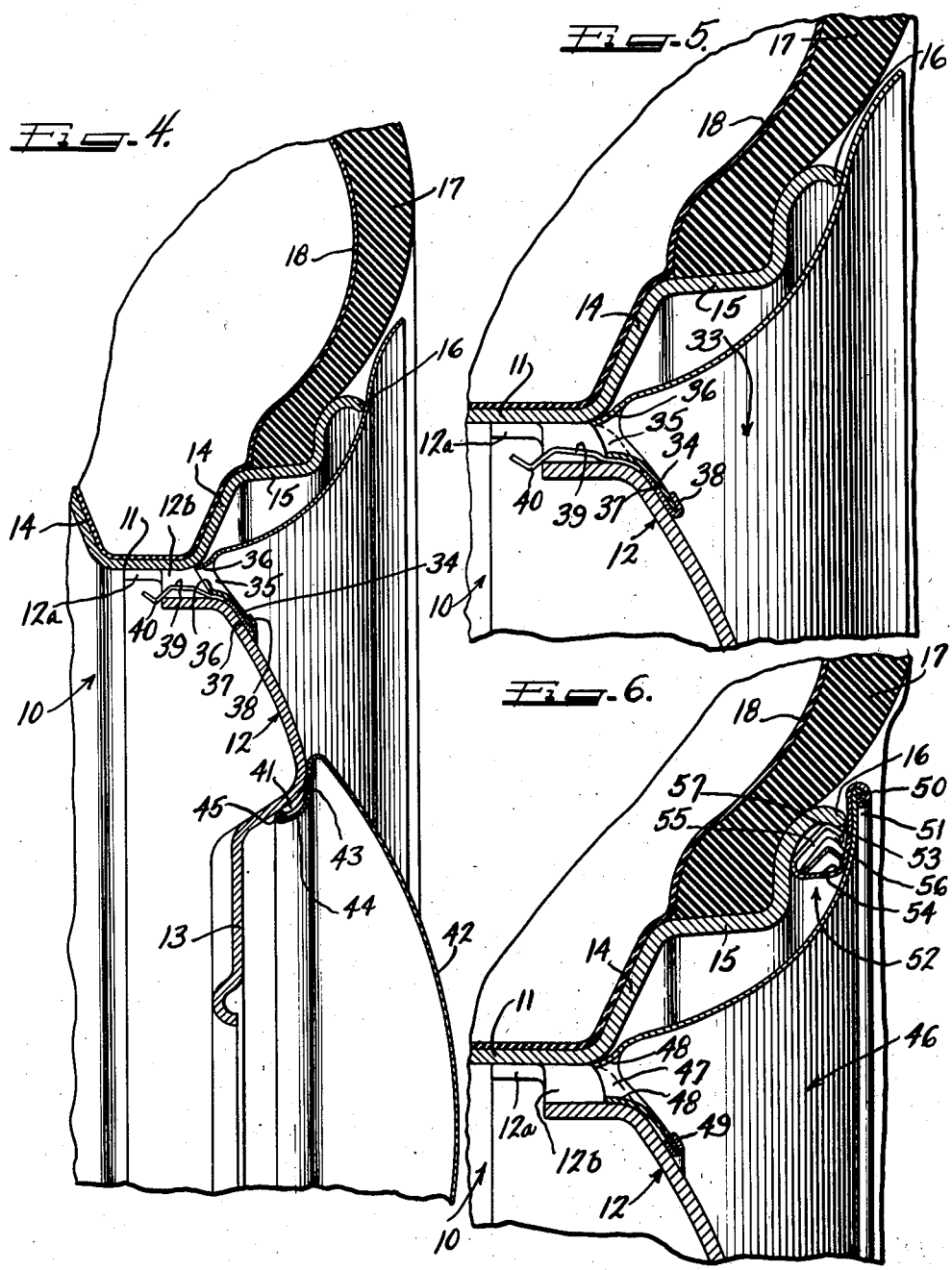

Patented Oct. 9, 1945

2,386,244

UNITED STATES PATENT OFFICE 2,386,244

WHEEL STRUCTURE

George Albert Lyon, Allenhurst, N. J.

Application January 7, 1944, Serial No. 517,323

9 Claims. (Cl. 301—37)

This invention is directed to an improved wheel structure and relates more particularly to an improved cover assembly for disposition over the outer side thereof.

It is an important object of the present invention to provide for a circular cover member adapted for disposition over the outer side of a wheel structure, improved retaining means for detachably maintaining the cover on the wheel.

It is another important object of the present invention to provide an improved cover assembly for disposition over the outer side of a wheel structure whereby the cover is positively aligned concentrically on the wheel against rotation relative thereto in an improved manner.

Still another object of the present invention is to provide, for disposition over the outer side of a wheel structure having a tire rim and a central load bearing portion, there being wheel openings circumferentially spaced along the junction of the wheel parts, an improved cover assembly and retaining means therefor, whereby the wheel openings are utilized for maintaining the cover upon the wheel and furthermore are instrumental in maintaining the cover in concentric alignment on the wheel against rotation relative thereto.

Still a further object of the present invention is to provide, for disposition over the outer side of a wheel structure, an improved cover assembly including a circular cover part formed from synthetic plastic sheet material or the like whereby it is self-sustaining as to form and yet locally, resiliently, temporarily flexible and whereby it will immediately snap back into initial configuration when distorting pressures are relieved therefrom, said cover assembly including improved retaining means serving to maintain the cover detachably over the outer side of the wheel structure and also serving to reinforce the circular cover part which is formed from the relatively frangible plastic material.

It is another object of the present invention to provide for disposition over the outer side of a wheel structure including wheel openings, an improved cover assembly whereby the wheel openings remain unobstructed and are thus available for ventilation of the adjacent wheel and vehicle parts, even though the cover be in attached position thereover.

In accordance with the general features of the invention there is provided herein for disposition over the outer side of a wheel structure including a flanged tire rim of the drop center type and a central load bearing portion, there being circumferentially spaced wheel openings along the junction of the wheel parts, a circular cover assembly having a radially outwardly extending portion formed from sheet synthetic plastic material or the like, said portion extending from the radially outer extremity of the tire rim radially inwardly to a point beyond the junction of the wheel parts and with a curvature substantially simulating the side wall of a tire in the rim, thereby to give the appearance of being a part thereof and to appear as a white side wall of the tire when colored while, the portion of the cover extending over the junction of the wheel parts being formed with openings arranged for alignment with the wheel openings of the wheel, these openings being bordered by generally axially inwardly extending defining flanges, which flanges are arranged to extend into the wheel openings to serve as a centering and aligning instrumentality for the wheel, there also being provided retaining means including a relatively rigid annulus formed from stainless sheet steel or the like whereby a high luster may be imparted thereto, said retaining means including a bead portion extending radially over the cover to appear as an intermediate bead thereon and having axially inwardly extending retaining fingers arranged for cooperation with the respective wheel openings to maintain the entire cover assembly over the wheel structure.

In accordance with other general features of the present invention, there is provided herein a cover assembly including a cover member of the above character, having retaining means as set forth above, said retaining means including an annular, axially outer, bead portion extending radially over a radially inner part of the cover to hug the same against the adjacent portion of the outer surface of wheel structure, there being provided in another form of the invention a retaining member having means extending axially inwardly into the respective wheel openings for co-engagement therewith and having an axially outer annular part provided with a terminal edge formed to envelop an edge of the plastic cover member to securely anchor the same against the wheel structure, the outwardly turned, enveloping edge of the retaining member serving as an ornamental, rigidifying border for the relatively frangible cover member.

Many other objects and advantages of the invention will become apparent from the following description and accompanying drawings in which:

Figure 1 is a side elevational view of a wheel structure embodying one form of my invention;

Figure 2 is an enlarged fragmentary, radial cross-sectional view of the construction shown in Figure 1;

Figure 3 is a still further enlarged fragmentary, radial cross-sectional view of the embodiments shown in Figure 2;

Figure 4 is an enlarged, fragmentary, radial cross-sectional view of a modified form of my invention;

Figure 5 is a further enlarged, fragmentary, radial cross-sectional view of the construction shown in Figure 4; and Figure 6 is an enlarged, fragmentary, radial cross-sectional view of a still further modified form of my invention.

It will be understood that the embodiments shown herein are for illustrative purposes only and may be changed or modified without departing from the spirit and scope of the invention as set forth in the appended claims.

The cover and retaining means embodying my present invention may be utilized with various types of wheel structures. However, in the present instance, the wheel structure shown in all of the figures includes a tire rim 10 of the flanged, drop center type having a central base flange 11 secured to a central load bearing portion 12 by means of an axially inwardly extending peripheral flange 12a of the load bearing portion 12 which may be secured to the base flange 11 as by welding or riveting or the like. The central load bearing portion 12 is further provided at the radially inert part thereof with a bolt-on flange 13 which is adapted to receive wheel bolts whereby the wheel may be secured to an appropriate part of the vehicle such as the brake drum or the like.

The tire rim 10 is further provided with opposite side wall flanges 14, opposite intermediate flanges 15 and opposite edge portions 16, between which may be disposed a tire 17 having an inner tube 18 provided with a valve stem 19, the latter being arranged to extend through an appropriate aperture in the adjacent side wall flange 14 to be accessible for application of the nozzle of an air hose thereto whereby the tire may be inflated.

As will best be seen from Figure 1, the peripheral flange 12a of the central load bearing portion 12 is depressed at spaced points, thereby to provide circumferentially spaced wheel openings along the junction between the tire rim 10 and the central load bearing portion 11, these wheel openings being available for aiding in the retention of the cover of the present invention upon the wheel as will be explained presently.

While a cover embodying the present invention may be in the form of an annulus or a complete disk, the latter form of cover is shown in Figures 1, 2 and 3. This cover, as shown herein, includes a radially outer annular part 20, an intermediate annular part 21 and a central circular hub cap simulating, crowned part 22. As indicated above, the present cover construction is preferably formed from sheet synthetic plastic material or the like, whereby, when the cover extends radially outwardly to or beyond the edge portion 16 of the tire rim, the outer part thereof may be locally, temporarily, resiliently flexed without permanently distorting the same, thereby to enter the rear side of the cover accessible for application of wheel balancing weights or the like or for removal of the cover from the wheel.

As will be seen from Figures 2 and 3, the cover portion 20 is provided at the radially outer margin thereof with a radially, outwardly extending portion 23 which extends beyond the edge portion 16 of the tire rim to entirely conceal the junction between the same and the tire 17 and extends radially inwardly with an intermediate curvature substantially simulating the curvature of the side wall of the tire 17, thereby to give the appearance of being a continuation thereof. The intermediate portion of the cover 20 merges radially inwardly with a generally radially inwardly, slightly axially outwardly, obliquely extending annular portion 21 which is arranged to abuttingly engage the adjacent portion of the outer surface of the central load bearing portion 12 of the wheel. This annular portion 21 in turn merges radially inwardly with a generally axially outwardly stepped portion 24 which in turn merges with the crowned portion 22 of the central part of the cover. Thus it will be seen that when the cover is urged axially inwardly, in concentric relationship to the wheel, and into the ultimate position shown in Figures 2 and 3, the intermediate annular portion 21 serves as a secure support for the entire cover assembly. Preferably, the curvature of the radially outer portion 20 is such that it engages the edge portion 16 before the surface abutment between the annular portion 21 and the central load bearing portion of the wheel 12 is attained, with the result that the cover portion 20 is maintained on the wheel under a condition of stress to greatly facilitate the secure attachment thereof on the wheel.

To the end that the cover may be properly aligned with the wheel and also to the end that it may be retained against rotation relative to the wheel once attached thereto, there is provided at the junction of the annular portion 21 and the cover portion 20, a plurality of apertures 25 which are defined by axially inwardly extending borders or walls 26. Preferably these apertures are of a size commensurate with the wheel openings 12b in the wheel structure and thus the respective walls 26 in a sense telescope into the wheel openings to provide a secure non-rotating, aligned relationship between the cover and the wheel.

To the end that the cover may be retained in the position shown in Figures 2 and 3 and described above, and in order that the intermediate part of the cover may be protected and further ornamented, there is provided herein a retaining member 27 which is preferably in the form of an annulus and includes an axially outwardly extending bead portion 28 which is formed to be axially outwardly convex and terminates at the radially inner edge in a bent back portion 29 which presents to the adjacent part of the cover a smooth surface. Preferably the radially inner edge of the annular bead portion 28 of the retaining member is disposed to be seated on the stepped portion 24 of the cover.

The annular bead portion 28 of the retaining member 27 terminates at the radially outer edge thereof in a circular, radially outwardly extending rib 30 which, as will be explained presently, serves admirably as a pry-off anchorage for removal of the cover from the wheel. Provided on circumferentially spaced parts of the radially outer portion of the retaining member 27 are generally axially inwardly extending resilient fingers 31 which terminate in radially inwardly extending humps 32. The circle prescribed by the radially inner extremities of the humps 32 is preferably slightly smaller than that prescribed by the radially outer surface of the depressed portions of the peripheral skirt or flange 12a of the central load bearing portion 12. Thus it will be seen that after the cover is disposed in a position shown in Figure 2, the operator may align the retaining member 27 concentrically with the wheel so that the resilient fingers 31 are aligned with the wheel openings, whereupon axial inward movement of the retaining member causes the fingers 31 to flex radially outwardly until the humps 32 have passed beyond the cut back edge of the depressed portions of the flange 12a of the wheel. Thereafter the fingers spring radially outwardly into the retaining position shown in Figures 2 and 3.

In order that the cover assembly may be removed from the wheel structure it is merely necessary for the operator to insert the point of a pry-off tool behind the bead 30 at any point thereof whereupon, with the adjacent portion of the edge portion of the wheel as a fulcrum, the outer part of the tool may be raised thereby to draw the points thereof axially outwardly together with the retaining member 27. From the foregoing it will be seen that in the construction provided, the major portion of the cover assembly which engages the wheel is the plastic material and thus the development of vibration and rattle is avoided. Thus there is provided a silent construction in which development of rattle does not occur even in the event of the application of destructive or distorting pressures to the outer side of the wheel. Furthermore, the wheel structure, together with the cover assembly, is provided with wheel openings for ventilation of the wheel parts and it will be seen that the cover does not obstruct these openings. It will be seen from Figures 2 and 3 that if desired the tire valve stem 19 may be of such length that it extends through a suitable aperture 20a in the adjacent portion of the cover part 20, whereby manipulation of the cover will be unnecessary in order to inflate the tire inner tube 18.

In the construction shown in Figures 4 and 5 there is provided a structure including a cover member 33 possessing the attributes of the cover portion 20 of the structure of Figures 2 and 3. The cover member 33, however, instead of being a radially outer portion of a disk-like structure, is merely an annulus terminating in a radially inwardly extending flange portion 34. Immediately radially outwardly of the annular flange 34 the cover member 33 is provided with a plurality of apertures 35 which are similar in size to and aligned with the wheel openings 12b of the wheel. These apertures 35 in the cover are each defined by generally axially inwardly extending walls 36, which, like the walls 26 of Figures 2 and 3, are arranged to telescopically engage in the wheel openings to provide for alignment of the cover therewith and for maintenance of the cover thereon against relative rotation.

The radially outer annular cover 33 is completed by the provision of an annular retaining member including an axially outer annular part 37 bent back as at 38 to envelop the edge of the flange 34 on the cover. The annulus 37 is further provided with generally axially inwardly extending resilient wheel engaging fingers 39 which terminate in radially inwardly facing humps 40. As in the case of the fingers 31 of Figures 2 and 3, the humps 40 of the fingers 39 prescribe a circle having a somewhat smaller diameter than that prescribed by the radially outer surface of the depressed portions of the flange 12a of the wheel. Accordingly, when the cover assembly is urged axially inwardly with the fingers 39 aligned with the respective apertures, the humps 40 engage the flange 12a to force the fingers radially outwardly until these humps have passed beyond the radially inner edge of the flange, whereupon the fingers spring radially outwardly to maintain the desired retained relation.

In utilizing the construction of Figure 4, it will be seen that prior to attachment to the wheel structure, the retaining member and particularly the annular portion 37 thereof is disposed adjacent the annular margin 34 of the cover with the edge of the retaining member extending radially inwardly thereover. The retaining member, so positioned, is then subjected to a suitable rolling operation whereupon the portion 38 thereof is bent around the edge of the annular part 34 of the cover 33 to envelop the same as shown in Figures 4 and 5. Thus the parts are permanently maintained in attached relationship as a single unit and may be secured to and removed from the wheel as such in the manner previously described.

In order to remove the cover construction of Figures 4 and 5 from the wheel, it will be seen that the operator need merely insert the point of a pry-off tool beneath the radially inwardly extending flange 37 of the retaining annulus, whereupon the same may be urged axially outwardly to disengage the respective fingers 39. Thereafter the remaining fingers may be easily drawn axially outwardly of the wheel to remove the cover completely.

While many different central ornamental members may be provided for a wheel structure embodying the construction of Figures 4 and 5, there is provided herein on the outer surface of the wheel a plurality of circumferentially spaced, circularly aligned protuberances 41 which present axially inwardly facing cam shoulders. The central cover member in the present instance is constructed preferably from sheet metal or the like and is provided with a central crowned portion 42 terminating in a radially inwardly extending flange 43 which in turn merges into an axially inwardly extending resilient snap-on flange 44. The flange 44 in turn terminates in a peripheral snap-on bead 45 which is arranged to be snapped behind the protuberances 40. The protuberances thus serve to detachably, yet securely, maintain the central cover portion 42 upon the wheel structure. In order that this central cover be removed from the wheel it will be seen that the operator need merely insert the point of a pry-off tool behind the radially outer extremity thereof and urge the same axially outwardly, whereupon the snap-on bead 45 is forced slightly out of round as it passes the peaks of the humps or protuberances 41.

From the foregoing it will be seen that in the constructions of Figures 4 and 5, the cover 33 is of annular formation and the radially inner edge thereof is effectively anchored and ornamented by virtue of the association of an annular retaining member therewith. With such a construction, the turned back portion 38 of the annular retaining member serves as an ornamental border for the cover, particularly when constructed from stainless steel or the like, whereby a high luster may be imparted thereto. Furthermore, the arrangement shown provides a unitary, multi-part cover structure in which all of the parts are securely maintained together against loss when not secured to the wheel.

In the construction of Figure 6, the plastic annular cover member 46 is provided with circularly aligned circumferentially spaced openings 47 defined by axially inwardly extending walls 48 as in the previous construction. These walls likewise telescope within the wheel openings 12b thereby to positively align the cover with the wheel and to secure the same against rotation relative thereto. To the end that the radially inner edge of the cover member 46, which is annular in form, may be protected, a circular bead 49 having an outwardly opening U-shaped cross-sectional configuration is enveloped around the said edge and clamped thereto by a suitable rolling operation. If desired, the member 49 may be formed from sheet stainless steel or the like, whereby a high luster may be imparted thereto in order that it serve as an ornamental border for the cover.

In this construction the cover 46 is maintained on the wheel structure by attachment at the radially outer edge thereof. In order to accomplish such an attachment the cover member 46 is preferably beaded at the radially outer edge as shown at 50. Rolled around the bead 50 of the cover is the outer margin 51 of an annular attachment member 52. The enveloping portion 51 of the attachment member constitutes the radially outer peripheral margin of a radially outwardly extending flange part 53 which terminates in a generally axially inwardly extending annular flange part 54. The flange part 54 terminates in resilient, generally axially outwardly, radially outwardly, obliquely disposed fingers 55 which in turn terminate in tips 56, the junction between these tips and the fingers 55 comprising radially outwardly extending peaks 57. The peaks 57 are arranged to fit tightly against the adjacent portion of the radially inner surface of the axially outwardly, slightly radially inwardly curved edge portion 16 of the tire rim and thus provide an easy-on, hard-off connection therewith.

With the foregoing construction of Figure 6 it will be seen that the radially inner edge as well as the radially outer edge of the relatively flangible plastic cover are efficiently protected against splitting and breakage by the members 49 and 52 respectively since these members are preferably formed form sheet steel or the like. Furthermore, the axially outwardly exposed parts of these metallic members, as described above, serve admirably as lustrous borders or beads for the radially inner and outer parts of the cover.

In mounting the cover of Figure 6 upon the wheel structure, it will be seen that the operator need merely align the walls 48 of the apertures 47 in the cover with the apertures 12b of the wheel, whereupon axial inward movement of the cover results in the telescoping relationship of the walls 48 in the wheel openings and also in the radial inward springing of the fingers 55 until the edge of the edge portion 16 of the tire rim is passed, whereupon the fingers 55 spring resiliently outwardly to provide the secure attached relationship shown in the drawings.

From the above it will be seen that there is provided herein an improved cover assembly which greatly reduces the unsprung weight of the wheel and having improved retaining means whereby the cover is efficiently protected against breakage and is supported at an intermediate part thereof (see Figures 1, 2 and 3), this retaining means and the cover being so arranged that the cover assembly is effectively and positively aligned with the wheel structure in concentric relationship thereto and against rotation relative thereto.

What I claim is:

1. In a wheel structure including a tire rim and a central load bearing portion, there being wheel openings along the junction of said rim and load bearing portion, a cover assembly including a circular cover having a part extending over the outer side of the wheel section including said openings, said cover part being formed to provide apertures arranged to be aligned with said wheel openings, said apertures being defined by generally axially, inwardly extending walls arranged to telescope into the wheel openings to align the cover on the wheel and to maintain the same thereon against rotation relative thereto, and means for securing the cover axially inwardly against the wheel, said securing means including an axially outer portion for engaging the cover and also axially inner portions arranged to extend through said wheel openings to detachably engage with a portion of the wheel.

2. In a wheel structure including a tire rim and a central load bearing portion, there being wheel openings formed along the junction of said rim and load bearing portion, a cover assembly including a circular cover member formed from sheet synthetic plastic material, said cover member being provided with a plurality of apertures arranged for alignment with said wheel openings and being defined by axially inwardly extending walls arranged to telescope within said openings and retaining means for maintaining the cover over the outer side of the wheel structure, said retaining means including an annular portion arranged to engage with a peripheral margin of the cover and an axially inwardly extending portion arranged for detachable engagement with the wheel structure.

3. In a wheel structure including a tire rim and a central load bearing portion, there being wheel openings formed along the junction of said rim and load bearing portion, a cover assembly including a circular cover member formed from sheet synthetic plastic material, said cover member being provided with a plurality of apertures arranged for alignment with said wheel openings and being defined by axially inwardly extending walls arranged to telescope within said openings and retaining means for maintaining the cover over the outer side of the wheel structure, said retaining means including an annular portion arranged to engage with a peripheral margin of the cover, and an axially inwardly extending portion arranged for detachable engagement with the wheel structure, said axially inwardly extending portion comprising a plurality of resilient finger members adapted to resiliently engage in said wheel openings and with an axially inner portion of the wheel.

4. In a wheel structure including a tire rim and a central load bearing portion, there being wheel openings formed along the junction of said rim and load bearing portion, a cover assembly of circular formation including a radially outer part for disposition over the flanges of the tire rim to conceal the same and a central circular hub cap simulating portion for disposition over the central part of the wheel, said annular and circular cover portion being connected integrally by an annular, flange-like cover portion arranged for disposition in surface engagement with the adjacent portion at the outer side of the central load bearing portion when the cover is disposed over the wheel, said cover also having formed therein at the part overlying the junction of the cover portions, a plurality of apertures defined by generally axially inwardly extending walls arranged to telescope within the respective apertures to maintain the cover on the wheel against rotation relative thereto, and retaining means for maintaining said cover over the outer side of the wheel structure including an annulus of general bead-like formation arranged to overlie the last named annular portion of the cover to maintain the same against the wheel structure, said bead-like portion including axially inwardly extending resilient fingers arranged to extend through the wheel openings to detachably engage the cover on the wheel.

5. In a wheel structure including a tire rim and a central load bearing portion, there being circumferentially spaced wheel openings along the junction of said wheel parts, a cover assembly formed from plastic material and including a radially outer annular portion provided with a cross-sectional expanse whereby it extends over the outer side of the tire rim to conceal the same, said annular cover portion being formed to provide a plurality of apertures for alignment with the wheel openings, said apertures being defined by axially inwardly extending walls arranged to telescope within the wheel openings and retaining means for the cover including axially inwardly extending portions arranged for detachable engagement with a part of the wheel structure and a portion for overlying an axially outer part of the cover.

6. In a wheel structure including a tire rim and a central load bearing portion, there being circumferentially spaced wheel openings along the junction of said wheel parts, a cover assembly formed from plastic material and including a radially outer annular portion provided with a cross-sectional expanse whereby it extends over the outer side of the tire rim to conceal the same, said annular cover portion being formed to provide a plurality of apertures for alignment with the wheel openings, said apertures being defined by axially inwardly extending walls arranged to telescope within the wheel openings and retaining means for the adjacent radial margin of the cover and also including axially inwardly extending portions arranged for detachable engagement with a part of the wheel structure, said axially inwardly extending portions comprising resilient fingers arranged to extend into the wheel openings to detachably engage with a part of the wheel at the axially inward extremity of the respective openings.

7. In a wheel structure including a tire rim and a central load bearing portion, there being spaced wheel openings along the junction of said rim and said load bearing portion, a cover assembly including an annular cover member formed from sheet synthetic plastic material, said cover member being arranged for disposition over the outer side of the tire rim to conceal the outer side thereof and having apertures formed therein for alignment with said wheel openings, said apertures being defined by axially inwardly extending walls arranged to telescope in the wheel openings, and means for retaining the cover over the outer side of the wheel structure with said walls telescoped in the respective wheel openings, said retaining means including an annular retaining member having a radially outwardly extending flange arranged for surface engagement with the radially outer margin of the cover and terminating in a rolled edge arranged to envelop the edge of the cover, said flange terminating at its other side in an axially inwardly extending annular flange, said axially inwardly extending flange terminating in axially outwardly, radially outwardly, obliquely disposed resilient fingers having portions adapted to retainingly engage a shoulder on the tire rim to maintain the cover thereon.

8. In a cover assembly for a wheel including a tire rim and a central load bearing portion, there being spaced apertures along the junction of said rim and load bearing portion, a cover member disposed over said wheel and over the apertures therein, said cover member having apertures therein in registry with those of the wheel, each of said apertures in the cover member being defined by a generally axially inwardly extending wall arranged to telescopingly engage in an aperture in the wheel and means for securing the cover member to said wheel including an annular member having a circular part disposed in overlying relation to a portion of the outer surface of the cover member to rigidify and ornament the same and also having axially inwardly extending means for retainingly engaging with a part of the wheel to secure said annular member and said cover member on the wheel.

9. The cover structure of claim 8 further characterized by the inwardly extending retaining means comprising a plurality of resilient fingers projecting through the openings of the cover member into the openings of the wheel for detachable snap-on retaining cooperation with one of the parts of the wheel.

GEORGE ALBERT LYON.